(12) United States Patent
Lee et al.

(10) Patent No.: US 10,377,041 B2
(45) Date of Patent: Aug. 13, 2019

(54) APPARATUS FOR AND METHOD OF SETTING BOUNDARY PLANE

(71) Applicant: HANWHA PRECISION MACHINERY CO., LTD., Changwon-do (KR)

(72) Inventors: Byung Hoon Lee, Changwon-si (KR); Neung Hyun Kyung, Changwon-si (KR)

(73) Assignee: HANWHA PRECISION MACHINERY CO., LTD., Changwon-si (KR)

(*) Notice: Subject to any disclaimer, the term of this patent is extended or adjusted under 35 U.S.C. 154(b) by 18 days.

(21) Appl. No.: 15/460,763

(22) Filed: Mar. 16, 2017

(65) Prior Publication Data

US 2018/0157248 A1 Jun. 7, 2018

(30) Foreign Application Priority Data

Dec. 6, 2016 (KR) .................. 10-2016-0165173

(51) Int. Cl.
*G06F 19/00* (2018.01)
*B25J 9/16* (2006.01)

(52) U.S. Cl.
CPC ... *B25J 9/1666* (2013.01); *G05B 2219/36433* (2013.01)

(58) Field of Classification Search
CPC ........ G05B 19/423; G05B 2219/36457; G05B 2219/36473
USPC .................................................. 700/245, 257
See application file for complete search history.

(56) References Cited

U.S. PATENT DOCUMENTS

| 6,212,443 | B1 | 4/2001 | Nagata et al. | |
|---|---|---|---|---|
| 9,211,648 | B2* | 12/2015 | Grinstead | B25J 19/023 |
| 9,554,508 | B2* | 1/2017 | Balutis | A01D 34/008 |
| 10,029,368 | B2* | 7/2018 | Wolowelsky | B25J 5/00 |
| 10,065,311 | B1* | 9/2018 | Buschmann | B25J 9/163 |
| 2005/0222713 | A1* | 10/2005 | Kawabe | B25J 19/021 |
| | | | | 700/259 |
| 2009/0234499 | A1* | 9/2009 | Nielsen | B25J 9/161 |
| | | | | 700/250 |
| 2010/0292843 | A1* | 11/2010 | Kariyazaki | B25J 9/1676 |
| | | | | 700/264 |
| 2011/0118753 | A1* | 5/2011 | Itkowitz | G06F 3/014 |
| | | | | 606/130 |
| 2013/0041219 | A1* | 2/2013 | Hasegawa | B25J 13/02 |
| | | | | 600/109 |
| 2014/0207285 | A1* | 7/2014 | Sakabe | B25J 9/1697 |
| | | | | 700/259 |
| 2014/0236356 | A1 | 8/2014 | Kuwahara | |
| 2015/0112482 | A1 | 4/2015 | Kuwahara | |

FOREIGN PATENT DOCUMENTS

| KR | 10-1504603 B1 | 3/2015 |
|---|---|---|
| KR | 10-2015-004812 A | 4/2015 |
| KR | 10-1607742 B1 | 3/2016 |

* cited by examiner

*Primary Examiner* — Ronnie M Mancho
(74) *Attorney, Agent, or Firm* — Sughrue Mion, PLLC

(57) ABSTRACT

A method of setting a boundary plane includes: obtaining pose data of a robot; calculating the boundary plane in a preset relationship with a reference part of the robot based on the obtained pose data; and displaying the calculated boundary plane.

19 Claims, 9 Drawing Sheets

| Pose | 211 | 212 | 213 | 214 |
|---|---|---|---|---|
| 1 | 0° | 0° | 0° | 90° |
| 2 | 36° | 30° | 50° | 80° |
| 3 | 90° | 20° | 70° | 110° |

APPARATUS FOR AND METHOD OF SETTING BOUNDARY PLANE

CROSS-REFERENCE TO RELATED APPLICATION

This application claims priority from Korean Patent Application No. 10-2016-0165173, filed on Dec. 6, 2016, in the Korean Intellectual Property Office, the disclosure of which is incorporated herein in its entirety by reference.

BACKGROUND

1. Field

One or more exemplary embodiments relate to an apparatus for and method of setting a boundary plane.

2. Description of the Related Art

With the rapid development of technology, robots have started to replace humans and play important roles as tools for performing various tasks. Robots can automatically perform a variety of tasks such as supplying, assembling, welding, and painting on production lines of manufactories in a similar manner to human arms, but with improved productivity.

Also, robots can interact with workers on shared production lines. Accordingly, a technology is needed for setting a virtual range beyond which the robots should not operate.

SUMMARY

One or more exemplary embodiments include a robot system, an apparatus for and method of intuitively setting a boundary plane defined as a virtual plane beyond which a robot should not operate.

One or more exemplary embodiments include a robot system, an apparatus for and method of setting a boundary plane through teaching of a user.

One or more exemplary embodiments may include a robot system, an apparatus for and method of rapidly setting a plurality of boundary planes.

One or more exemplary embodiments may include a robot system, an apparatus for and method of setting a boundary plane to guarantee the safety of a worker.

Additional aspects will be set forth in part in the description which follows and, in part, will be apparent from the description, or may be learned by practice of the presented exemplary embodiments.

According to one or more exemplary embodiments, a method of setting a boundary plane beyond which a robot should not operate includes: obtaining pose data of the robot; calculating a virtual plane in a preset relationship with a reference part of the robot based on the obtained pose data; generating the boundary plane corresponding to the calculated virtual plane; and displaying the generated boundary plane.

The obtaining of the pose data may include receiving the pose data from a position detecting unit included in each of the one or more joints of the robot.

The method may include operating at least one of the one or more joints according to teaching of a user, and generating position data of each of the one or more joints corresponding to the teaching, and the pose data may include the position data.

The receiving of the pose data may include receiving the position data after physical manipulation of the robot by the user or electrical manipulation of the robot by the user as the teaching of the user.

The method may include operating each of the one or more joints based on task data of the robot, generating position data of each of the one or more joints corresponding to the task data, and the pose data may include the position data. The calculating of the virtual plane may include calculating the virtual plane based on the position data when the robot operates based on the task data.

The calculating of the virtual plane may include calculating the virtual plane when the reference part is located at a farthest position from the robot while the robot operates based on the task data.

The method may include measuring an angle of each of the one or more joints, and the pose data may include the measured angles of each of the one or more joints.

The calculating of the virtual plane according to the preset relationship with the reference part may include calculating the virtual plane parallel to a reference plane of the reference part.

The calculating of the virtual plane according to the preset relationship with the reference part may include calculating the virtual plane perpendicular to a reference line that is parallel to at least one portion of the reference part.

The displaying of the generated boundary plane may include further displaying a three-dimensional (3D) shape of the robot based on the pose data.

The method may include obtaining pose data for a plurality of poses of the robot, calculating a plurality of virtual planes each corresponding to a respective one of the plurality of poses based on the pose data, generating a plurality of boundary planes corresponding to the plurality of calculated virtual planes and beyond which the robot should not operate, and displaying the plurality of generated boundary planes.

According to one or more exemplary embodiments, an apparatus for setting a boundary plane beyond which a robot should not operate includes: a controller configured to calculate a virtual plane according to a preset relationship with a reference part of the robot based on pose data of a robot, and generate the boundary plane corresponding to the calculated virtual plane; and a display unit configured to display the generated boundary plane.

The controller may be further configured to receive the pose data of a robot from the position detecting unit included in each of the one or more joints of the robot.

The pose data may include position data of each of the one or more joints operated according to teaching of a user.

The controller may be further configured to receive the position data after physical manipulation by the user or electrical manipulation of the user as the teaching of the user.

The pose data may include an angle measure of each of the one or more joints.

The controller may be further configured to calculate the virtual plane parallel to a reference plane of the reference part.

The controller may be further configured to calculate the virtual plane perpendicular to a reference line of the reference part.

According to one or more exemplary embodiments, a system includes: a robot including one or more joints, each of the one or more joints including a position detecting unit configured to generate position data of a respective joint of the one or more joints; and an apparatus for setting a boundary plane beyond which the robot should not operate, the apparatus configured to receive the position data from each position detecting unit included in the one or more joints of the robot, calculate a virtual plane according to a preset relationship with a reference part of the robot based on the generated position data, generate the boundary plane corresponding to the calculated virtual plane, and display unit configured to display the generated boundary plane.

Each of the one or more joints may be configured to operate according to teaching of a user by physical manipulation or electrical manipulation, and the position data of each of the one or more joints may correspond to the teaching of the user.

Each position detecting unit may include an angle measuring unit configured to measure an angle of the respective joint of the one or more joints.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
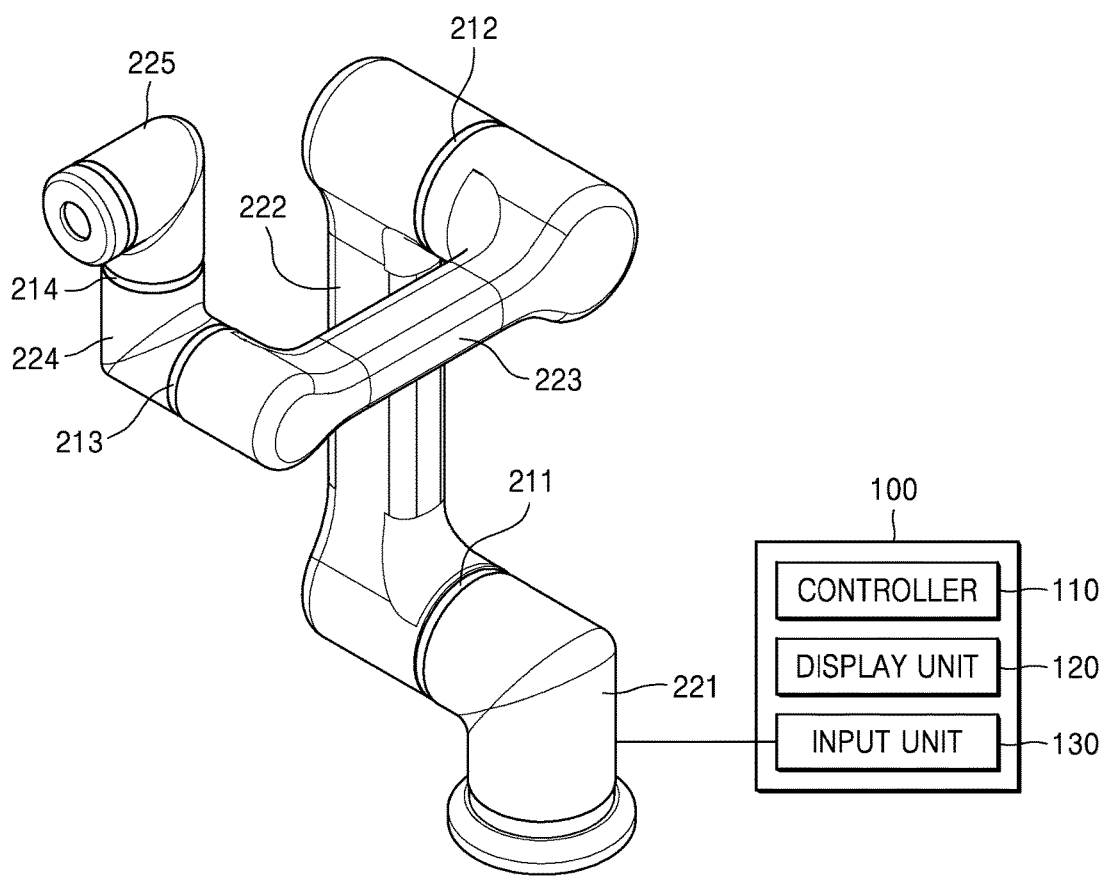
FIG. 1 is a view of a robot system according to an embodiment.

As the present disclosure allows for various changes and numerous embodiments, exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of the related art are omitted when it is deemed that they may unnecessarily obscure the essence of the present disclosure.

While such terms as "first", "second", etc., may be used to describe various components, such components must not be limited to the above terms. The above terms are used only to distinguish one component from another.

The terms used in the present specification are merely used to describe exemplary embodiments, and are not intended to limit the present disclosure. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but may include software routines in conjunction with processors, etc.

As used herein, the term "and/or" includes any and all combinations of one or more of the associated listed items. Expressions such as "at least one of" when preceding a list of elements, modify the entire list of elements and do not modify the individual elements of the list.

FIG. 1 is a view of a robot system according to an exemplary embodiment.

Referring to FIG. 1, the robot system according to an embodiment may include an apparatus 100 for setting a boundary plane and a robot 200.

The robot 200 may be a device including one or more actuators and one or more parts. In this case, the term 'actuator' may refer to any of various devices for converting electrical energy into kinetic energy based on a control signal. For example, the actuator may be any one from among, but not limited to, a direct current (DC) servo motor, an alternating current (AC) servo motor, a stepping motor, a linear motor, a hydraulic cylinder, a hydraulic motor, a pneumatic cylinder, and a pneumatic motor. The term 'part' may refer to a structure for fixing the actuator to a specific position or a movable structure fixed to the actuator.

The robot 200 according to an exemplary embodiment may be any one from among, for example, an articulated robot, a selective compliance assembly robot arm (SCARA) robot, and a cylindrical robot. The articulated robot may be a robot having one or more joints and parts (or bodies) for connecting different joints. The SCARA robot may be a robot including an arm that operates in a specific plane. The cylindrical robot may be a robot including an arm that has at least one rotary joint and at least one prismatic joint. However, embodiments are not limited thereto. Accordingly, any robot that includes one or more actuators and one or more parts and operates according to a control signal may be the robot 200 according to an exemplary embodiment.

For convenience of explanation, it is assumed in the following description that the robot 200 is an articulated robot having one or more joints and parts for connecting the joints as shown in FIG. 1. In detail, it is assumed in the following description that the robot 200 includes four joints 211, 212, 213, and 214 and five parts 221, 222, 223, 224, and 225, each of the fourth joints 211, 212, 213, and 214 includes a position detecting unit, and in this case, the position detecting unit is an angle measuring unit for measuring a rotation angle of the joint.

The apparatus 100 according to an exemplary embodiment may include a controller 110, a display unit 120, and an input unit 130.

The controller 110 according to an exemplary embodiment may calculate a boundary plane based on pose data of the robot 200. In this case, the controller 110 may include any type of device for processing data, for example, a processor. The term 'processor' may refer to a data processing device embedded in hardware and having physical circuitry to carry out codes or instructions of a program. Examples of the data processing device embedded in the hardware may include, but not limited to, a microprocessor, a central processing unit (CPU), a processor core, a multi-processor, an application-specific integrated circuit (ASIC), and a field programmable gate array.

The display unit 120 according to an exemplary embodiment may display the boundary plane generated by the controller 110. Accordingly, the display unit 120 may be a display device for displaying figures, letters, or images. For example, the display unit 120 may include any one from among, but not limited to, a cathode ray tube (CRT), a liquid crystal display (LCD), a plasma display panel (PDP), a light-emitting diode (LED), and an organic light-emitting diode (OLED).

The input unit 130 according to an exemplary embodiment may refer to any of various means for obtaining an input of a user. For example, the input unit 130 may be a keyboard, a mouse, a trackball, a microphone, a button, or a combination thereof. Also, the input unit 130 may refer to, but not limited to, a touch unit for inputting a touch to the display unit 120.

Although not shown in FIG. 1, the apparatus 100 according to an exemplary embodiment may further include a communication unit (not shown) and memory (not shown).

In this case, the communication unit may be a device including hardware and software needed to transmit/receive a control signal through wired/wireless connection between the apparatus 100 and an external device such as the robot 200.

The memory temporarily or permanently stores data processed by the apparatus 100. The memory may include, but is not limited to, a magnetic storage medium or a flash storage medium.

The apparatus 100 according to an exemplary embodiment may be separated from the robot 200 and/or a robot control device (not shown) as shown in FIG. 1. Alternatively, the apparatus 100 may be included in the robot 200 and/or the robot control device. In other words, the robot 200 and/or the robot control device may perform a method of setting a boundary plane according to an exemplary embodiment. However, for convenience of explanation, it is assumed in the following description that the apparatus 100 is separately provided as shown in FIG. 1.

The controller 110 according to an embodiment may generate a boundary plane based on pose data of the robot 200.

In the present disclosure, the term "pose" of the robot 200 may refer to a specific state of the robot 200 in a three-dimensional (3D) space. For example, when the robot 200 is an articulated robot as described above, the "pose" of the robot 200 may refer to at least one of a rotation angle of each joint, a position of each part in the 3D space, and a driving condition of an actuator that is included in each joint when the robot 200 is in a specific state.

In the present disclosure, the term "boundary plane" may refer to a virtual plane with a sufficiently large size beyond which the robot 200 should not operate. According to an embodiment, the boundary plane may refer to a safety boundary plane beyond which the robot 200 should not operate in order to protect a worker, i.e., a human worker, in a shared workspace. Also, the boundary plane may refer to a collision boundary plane beyond which the robot 200 should not operate in order to prevent collision between the robot 200 and another robot (not shown) in a shared workplace.

Since each joint of the robot 200 includes an angle measuring unit as a position detecting unit as described above, the controller 110 according to an exemplary embodiment may receive pose data including position data generated by the position detecting unit of each joint from the robot 200.

Figures 2, 3:
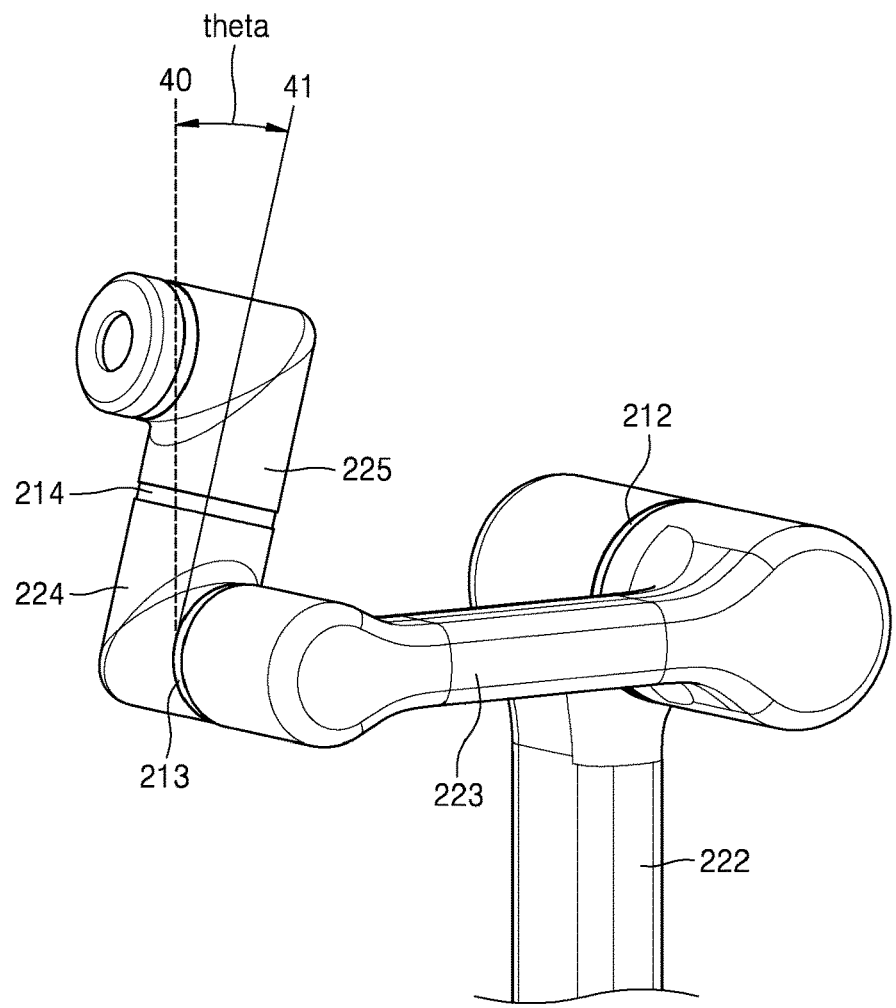
FIG. 2 is a view for explaining a method performed by a position detecting unit to generate position data of a joint according to an exemplary embodiment.
FIG. 3 is a diagram illustrating pose data of a robot received by a controller from the robot according to an exemplary embodiment.

FIG. 2 is a view for explaining a method performed by the position detecting unit to generate position data of the joint 213 according to an exemplary embodiment.

The joint 213 is a joint for changing a relative positional relationship between the part 223 and the part 224 through rotation as shown in FIG. 2. In this case, when it is assumed that a state where a central line 41 of the part 224 and a reference line 40 are parallel to each other is a state where a rotation angle of the joint 213 is 0°, the position detecting unit may generate position data including theta that is an angle between the central line 41 of the joint 213 and the reference line 40.

The controller 110 may receive, from the robot 200, pose data including the position data generated by the position detecting unit of each of the joints 211, 212, 213, and 214 by using the above method and may recognize a pose of the robot 200.

FIG. 3 is a diagram illustrating pose data of the robot 200 received by the controller 110 from the robot 200 according to an exemplary embodiment.

For example, when the robot 200 has a pose 1, a rotation angle of each of three joints 211, 212, and 213 may be 0° and a rotation angle of the joint 214 may be 90°. A reference line that is a basis for measuring an angle of each of the joints 211, 212, 213, and 214 may be set for each of the joints 211, 212, 213, and 214.

Since the robot 200 according to an exemplary embodiment is an articulated robot and a relative positional relationship of five parts 221, 222, 223, 224, and 225 is determined only by the four joints 211, 212, 213, and 214 as described above, a pose of the robot 200 may be changed by pose data shown in FIG. 3. In other words, when the number of joints and/or a shape of each joint included in the robot 200 is changed, the pose data may also be changed.

In order to obtain pose data of the robot 200, first, the robot 200 has to take a corresponding pose. In other words, in order to obtain pose data of the robot 200, each of the joints 211, 212, 213, and 214 of the robot 200 has to be rotated at an angle corresponding to the corresponding pose.

Each of the joints 211, 212, 213, and 214 may be rotated according to teaching of the user. In other words, the one or more joints 211, 212, 213, and 214 may operate according to teaching of the user.

In the present disclosure, the term "teaching" may refer to a process performed by the user to manipulate the robot 200 so that the robot 200 takes a specific pose. In this case, the term "manipulation" may refer to a process in which the user causes the robot 200 to take a specific pose by applying a physical force to the robot 200. Alternatively, the term "manipulation" may refer to a process in which the user causes the robot 200 to take a specific pose by electronically using a controller of the robot 200, such as controller 110.

Figure 4A:
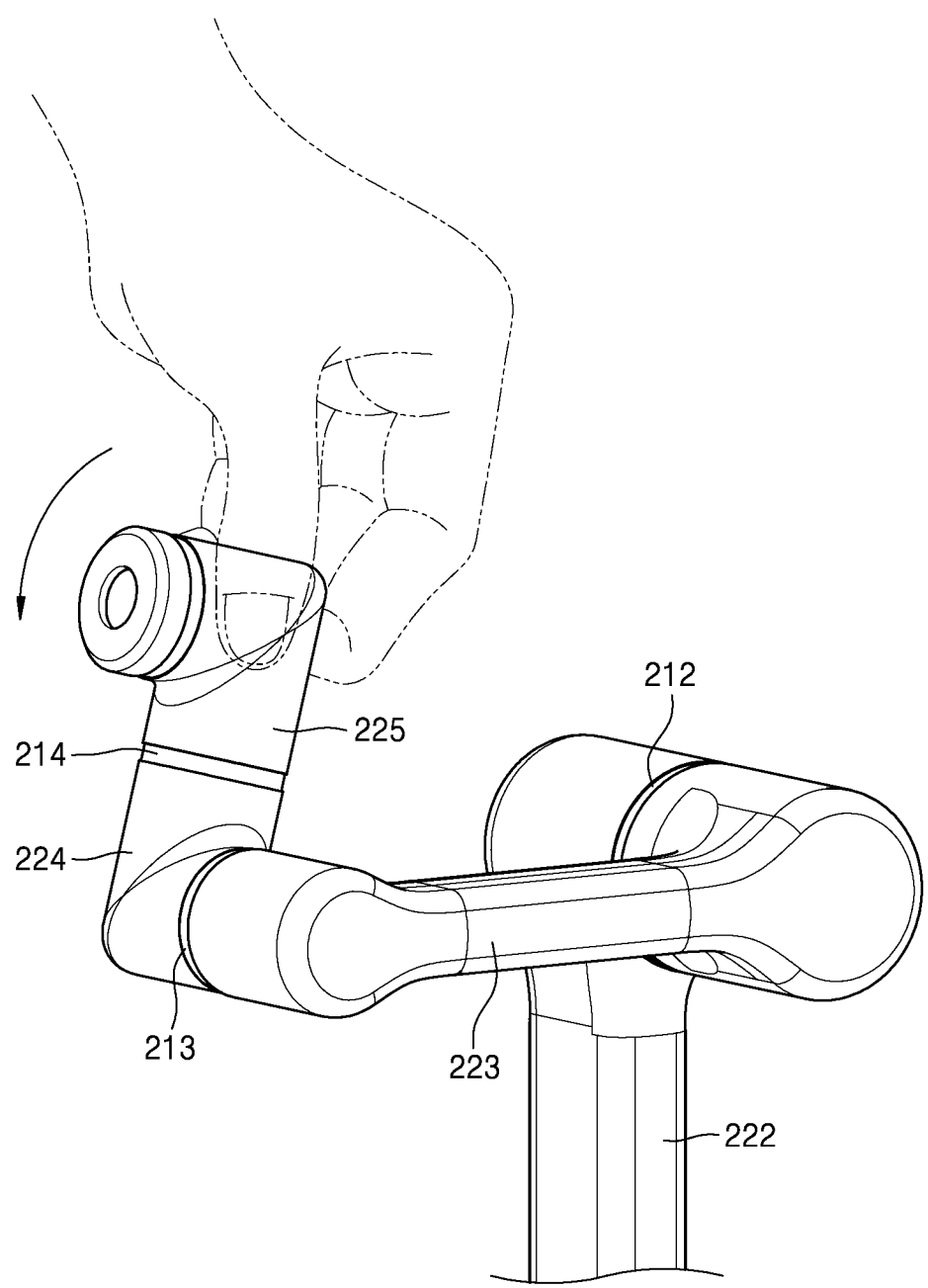
FIGS. 4A and 4B are views for explaining a case where teaching of a user involves physical manipulation of the robot according to an exemplary embodiment.
Figure 4B:
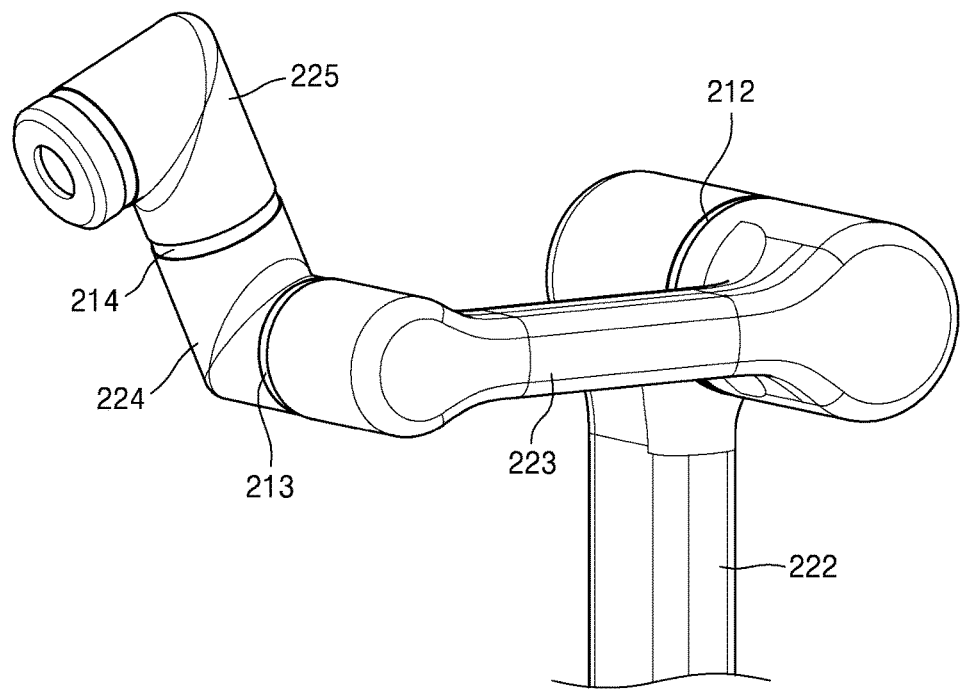

FIGS. 4A and 4B are views for explaining a case where teaching of the user involves physical manipulation of the robot 200 according to an exemplary embodiment.

For example, it is assumed that the joint 213 is in a state of FIG. 4A and the user wants to teach the robot 200 to be in a state of FIG. 4B.

In this case, the user may hold part assemblies 225 and 224 in the hand and force the part assemblies 225 and 224 to move downward to change a rotation angle of the joint 213 to an angle of FIG. 4B.

In this case, the joint 213 of the robot 200 and the remaining joints 211, 212, and 214 may have appropriate resistive forces to allow rotation by the user. In other words, when the user teaches the robot 200 through physical manipulation, the user may apply enough rotational torque to change a rotation angle of a joint in a pose.

A position detecting unit of each of the joints 211, 212, 213, and 214 may generate position data corresponding to a pose of the robot 200 determined by using the above method, and the controller 110 may receive, from the robot 200, pose data including the generated position data.

Figure 5A:
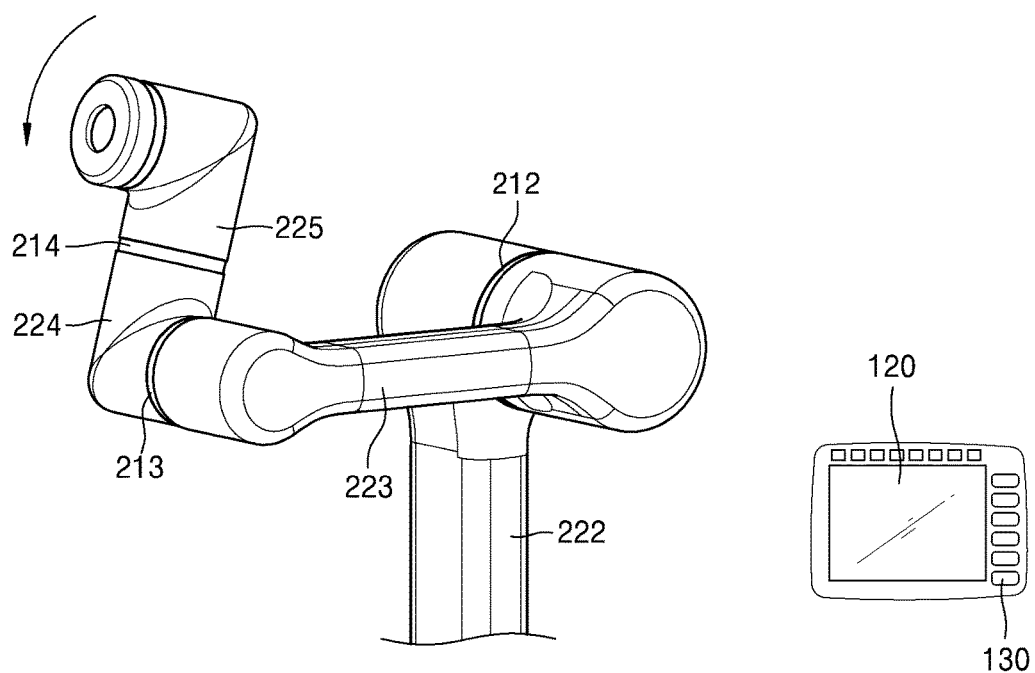
FIGS. 5A and 5B are views for explaining a case where teaching of the user involves electronic manipulation of the robot according to an exemplary embodiment.
Figure 5B:
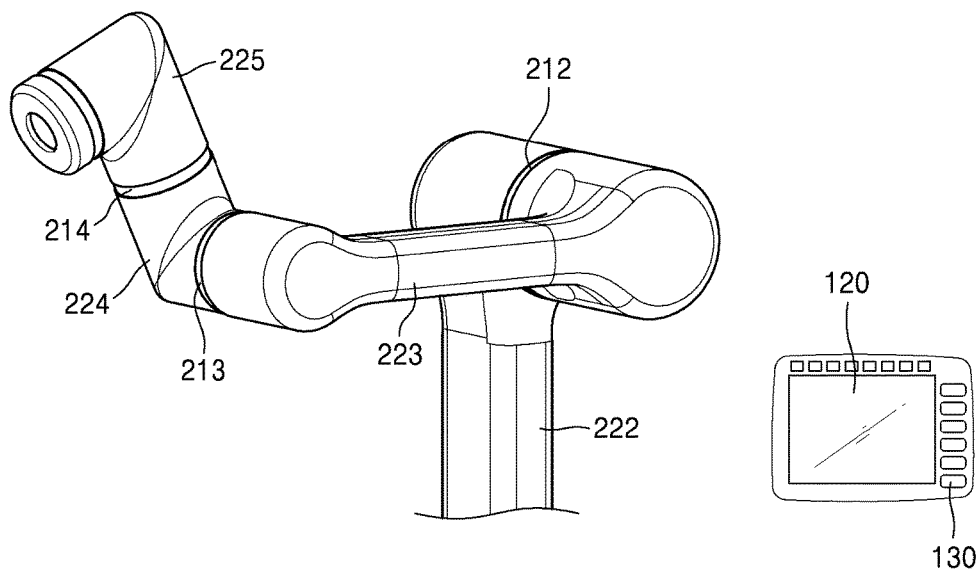

FIGS. 5A and 5B are views for explaining a case where teaching of the user involves electronic manipulation of the robot 200 according to an exemplary embodiment.

Like above, it is assumed that the joint 213 is in a state of FIG. 5A and the user is to teach the joint 213 to be in a state of FIG. 5B.

In this case, the user may change a rotation angle of the joint 213 to an angle of FIG. 5B by manipulating the robot 200 through the input unit 130. In this case, the user may manipulate the robot 200 by inputting a rotation angle of each of the joints 211, 212, 213, and 214 or by inputting a position of each of the parts 221, 222, 223, 224, and 225 through the input unit 130. Alternatively, the user may manipulate the robot 200 by dragging or clicking on a shape of the robot 200 displayed on the display unit 120 through the input unit 130.

A position detecting unit of each of the joints 211, 212, 213, and 214 may generate position data corresponding to a pose of the robot 200 determined by using the above method, and the controller 110 may receive, from the robot 200, pose data including the generated position data.

The controller 110 according to an embodiment may calculate a boundary plane that has a preset relationship with a reference part of the robot 200 based on the pose data received from the robot 200.

In the present disclosure, the term "reference part" may refer to any part set by the user from among one or more parts included in the robot 200 and acting as a basis for setting the boundary plane. For example, the reference part may refer to, but not limited to, a part to which a tool according to an objective and/or use of the robot 200 is attached.

For example, the user may set the part 225 (see FIG. 1) as the reference part, and may calculate the boundary plane based on the part 225.

Figure 6A:
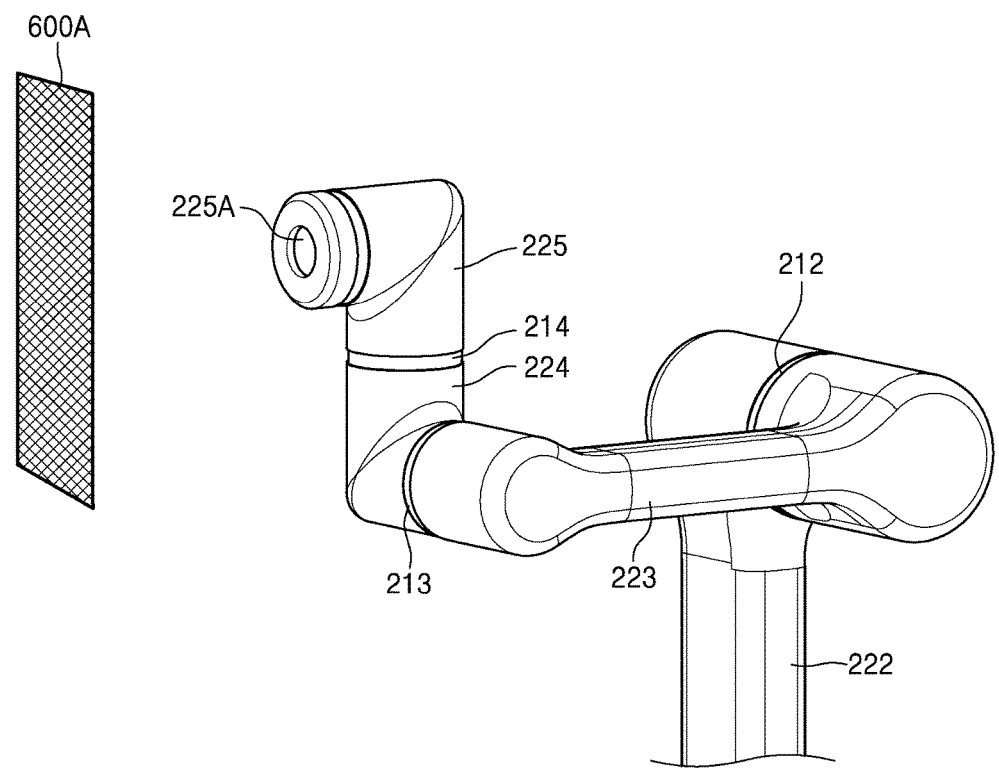
FIGS. 6A and 6B are views for explaining a method performed by the controller to set a boundary plane based on a reference part according to an exemplary embodiment.
Figure 6B:
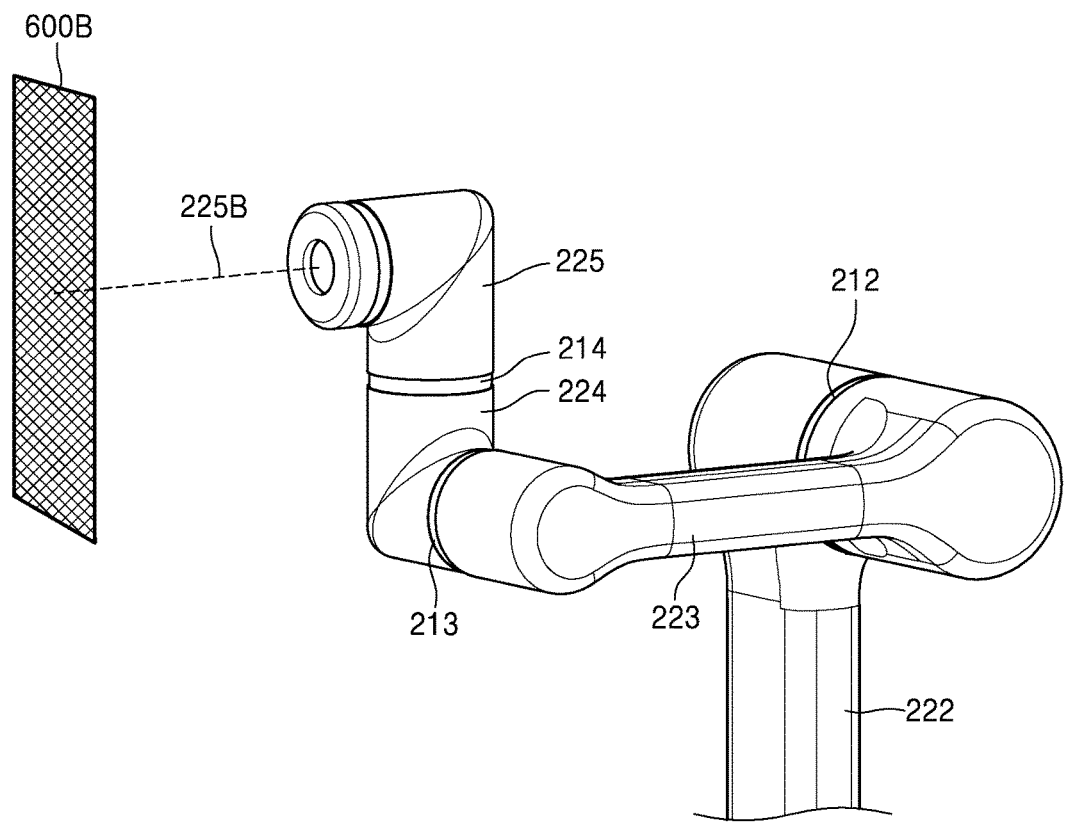

FIGS. 6A and 6B are views for explaining a method performed by the controller 110 to set a boundary plane based on the part 225 (referred to as the reference part 225) according to an embodiment.

First, referring to FIG. 6A, the controller 110 may calculate a boundary plane 600A that is a plane parallel to a reference plane 225A included in the reference part 225. In this case, the reference plane 225A may be at least one from among planes that constitute an outer appearance of the reference part 225. For example, the reference plane 225A may refer to, but not limited to, a plane to which a tool according to an objective and/or use of the robot 200 is attached.

The controller 110 may calculate the boundary plane 600A so that the boundary plane 600A is spaced apart by a predetermined interval from the reference plane 225A. In this case, the predetermined interval may be determined based on a length of the tool attached to the reference part 225.

Next, referring to FIG. 6B, the controller 110 may calculate a boundary plane 600B that is a plane perpendicular to a reference line 225B that is parallel to at least a part of the reference part 225. In this case, the reference line 225B may be parallel to any one from among lines that constitute the outer appearance of the reference part 225.

Even in this case, the controller 110 may calculate the boundary plane 600A so that the boundary plane 600B is spaced apart by a predetermined interval from the reference part 225. In this case, the predetermined interval may be determined based on the length of the tool attached to the reference part 225.

The controller 110 according to another exemplary embodiment may calculate a boundary plane when a reference part is at a farthest position from a location of the robot 200 while the robot 200 operates based on task data. In this case, the task data may refer to a control signal for controlling the robot 20 so that the robot 200 performs a task according to an objective and/or use. For example, when the robot 200 is a delivery robot, the task data may refer to a series of control signals for causing the robot 200 to pick up an object at a specific position and putting down the object at another position.

The controller 110 according to another exemplary embodiment may calculate a boundary plane when the robot 200 operates based on the task data. In more detail, the boundary plane may be calculated when the reference part is located at the farthest position from the location of the robot 200 while the robot 200 operates based on the task data.

Accordingly, the user may allow the robot 200 to perform one period of task and a boundary plane may automatically be calculated as a result. Accordingly, the boundary plane may conveniently be set without the user needing to individually set each boundary plane.

The controller 110 according to an exemplary embodiment may display the boundary plane calculated by using the above process on the display unit 120. In this case, the controller 110 may further display a 3D shape of the robot 200 on the display unit 120 based on the pose data received from the robot 200. In other words, the controller 110 may display a 3D shape of the robot 200 along with the calculated boundary plane on the display unit 120. Accordingly, the user may intuitively recognize the boundary plane.

Figure 7:
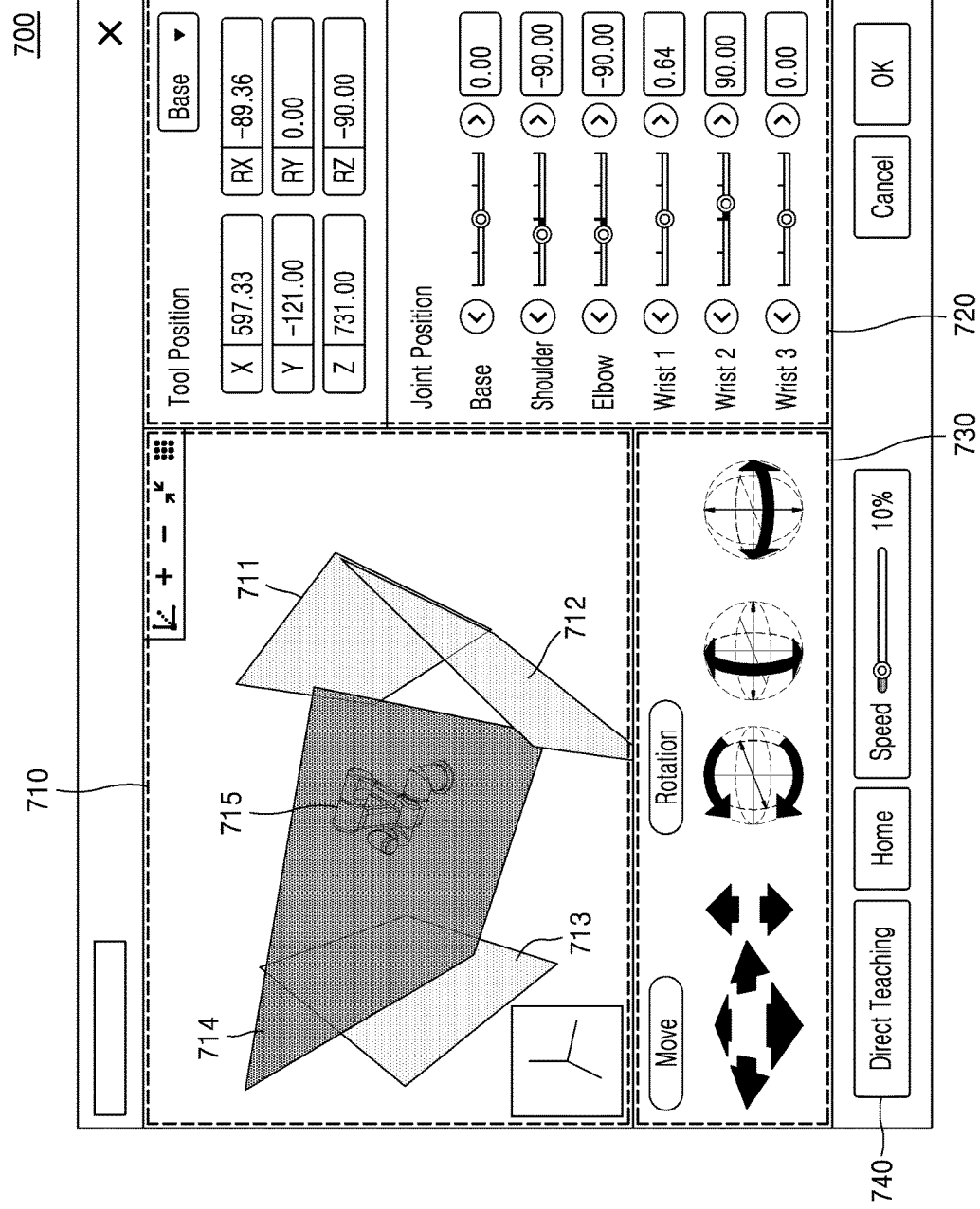
FIG. 7 is a view illustrating a screen on which a boundary plane is generated and displayed according to an exemplary embodiment.

FIG. 7 is a view illustrating a screen 700 on which a boundary plane is generated and displayed according to an exemplary embodiment.

Referring to FIG. 7, the screen 700 may include an area 710 in which boundary planes 711, 712, and 713 that have already been generated, a boundary plane 714 that is being currently generated, and a 3D shape 715 of the robot 200 are displayed, an area 720 in which a position of a reference part in a 3D space and a rotation angle of each joint are displayed, an area 730 in which a manipulation interface for manipulating the reference part in the 3D space is displayed, and a button 740 for setting a teaching mode.

For example, when the user pushed the button 740 for setting the teaching mode to select a mode in which teaching is performed through physical manipulation and physically manipulates the robot 200, the 3D shape 715 of the robot 200 and the boundary plane 714 that is being currently generated may be updated and displayed as the user manipulates the robot 200.

Also, when the user changes the position of the reference part in the 3D space through the manipulation interface displayed in the area 730, the 3D shape 715 of the robot 200 and the boundary plane 714 that is being currently generated may be updated and displayed as the user manipulates the robot 200.

As such, the user may set a boundary plane suitable for his/her intention while watching the screen 700 that is updated in real time as the user physically or electronically manipulates the robot 200.

Figure 8:
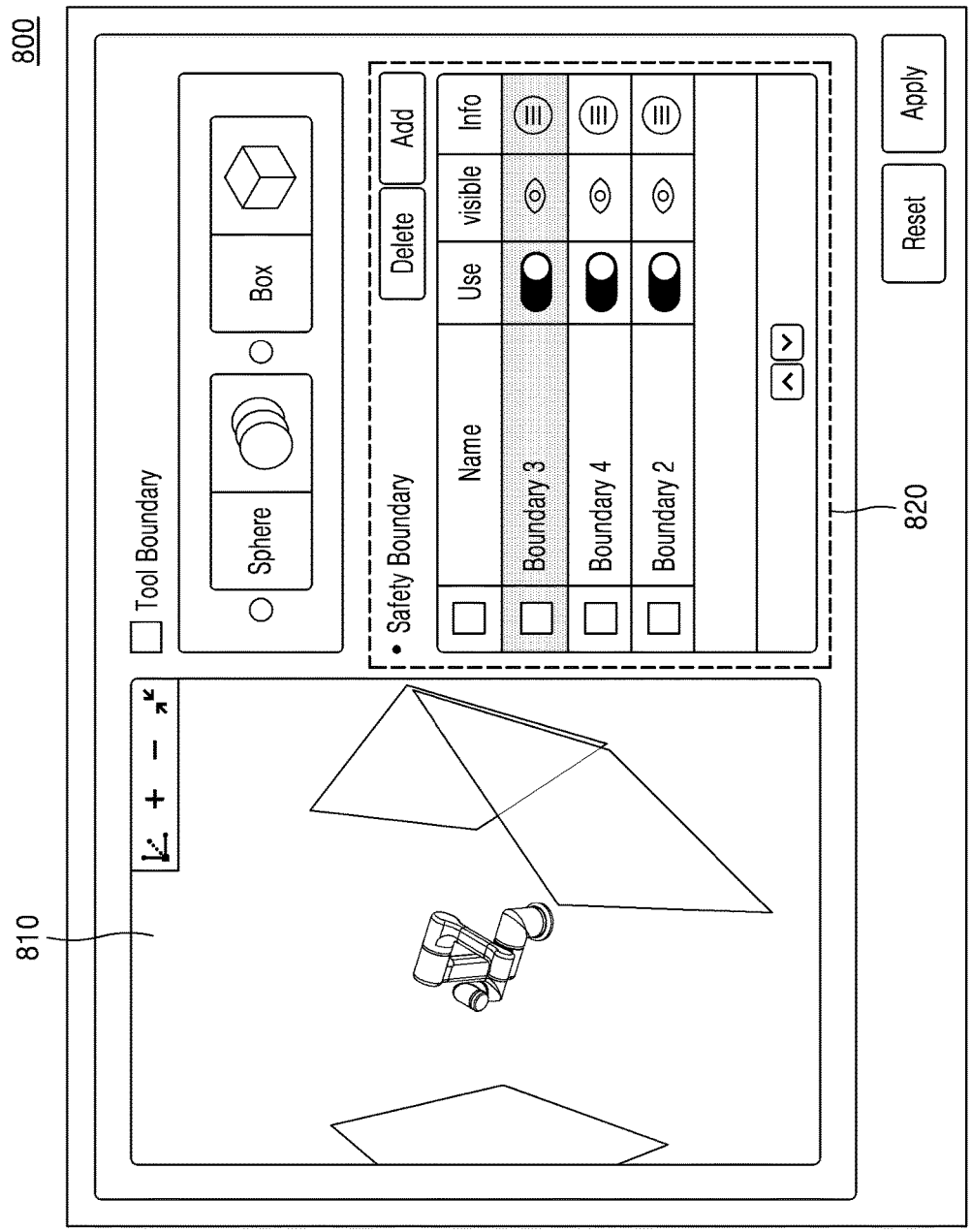
FIG. 8 is a view illustrating a screen for determining whether to use a generated boundary plane according to an exemplary embodiment.

FIG. 8 is a view illustrating a screen 800 for determining whether to use a generated boundary plane according to an exemplary embodiment.

Referring to FIG. 8, the screen 800 may include an area 810 in which a boundary plane that has already been generated and a 3D shape of the robot 200 are displayed and an area 820 for selecting whether to use each boundary plane.

The user may determine whether to use and display the boundary plane that has already been generated by performing an input operation on the area 820. Alternatively, the user may generate a new boundary plane by using the screen 700 of FIG. 7 by performing an operation corresponding to addition of the new boundary plane to the area 820.

Figure 9:
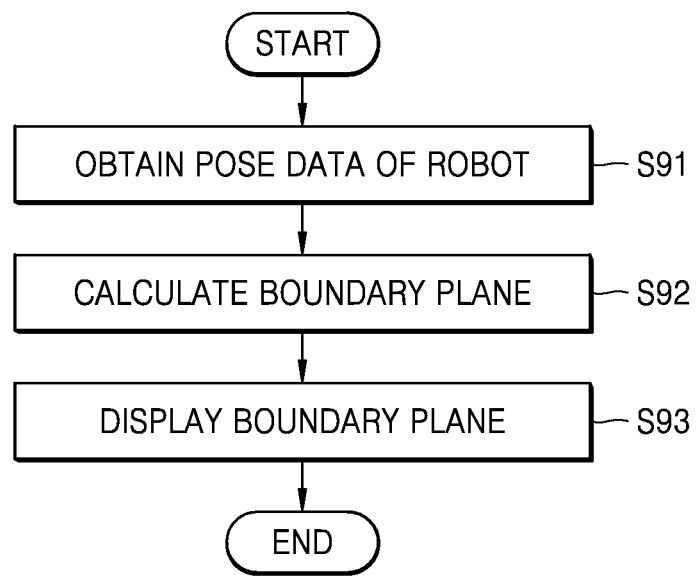
FIG. 9 is a flowchart of a method of setting a boundary plane performed by an apparatus for setting a boundary plane of FIG. 1 according to an exemplary embodiment.

FIG. 9 is a flowchart of a method of setting a boundary plane performed by the apparatus 100 of FIG. 1 according to an exemplary embodiment. The same description as presented with reference to FIGS. 1 through 8 will not be repeated.

In operation S91, the controller 110 according to an exemplary embodiment may calculate a boundary plane based on pose data of the robot 200.

In the present disclosure, the term "pose" of the robot 200 may refer to a specific state of the robot 200 in a 3D space. For example, when the robot 200 is an articulated robot as described above, the "pose" of the robot 200 may refer to at least one of a rotation angle of each joint, a position of each part in the 3D space, and a driving condition of an actuator that is included in each joint when the robot 200 is in a specific state.

In the present disclosure, the term "boundary plane" may refer to a virtual plane with a sufficiently large size beyond which the robot 200 should not operate. According to an exemplary embodiment, the boundary plane may refer to a safety boundary plane beyond which the robot 200 should not operate in order to protect a worker, i.e., a human worker, in a shared workspace. Also, the boundary plane may refer to a collision boundary plane beyond which the robot 200 should not operate in order to prevent collision with another robot (not shown) in a shared workplace.

Since each joint of the robot 200 includes an angle measuring unit as a position detecting unit as described above, the controller 110 according to an exemplary embodiment may receive pose data including position data generated by the position detecting unit of each joint from the robot 200.

In order to obtain pose data of the robot 200, the robot 200 has to take a corresponding pose. In other words, in order to obtain pose data of the robot 200, each of the joints 211, 212, 213, and 214 (see FIG. 1) of the robot 200 has to rotate at an angle corresponding to the corresponding pose.

Each of the joints 211, 212, 213, and 214 may be rotated according to teaching of the user. In other words, the one or more joints 211, 212, 213, and 214 may operate according to teaching of the user.

In the present disclosure, the term "teaching" may refer to a process performed by the user to manipulate the robot 200 so that the robot 200 takes a specific pose. In this case, the term "manipulation" may refer to a process in which the user causes the robot 200 to take a specific pose by applying a physical force to the robot 200. Alternatively, the term "manipulation" may refer to a process in which the user causes the robot 200 to take a specific pose by electronically using a controller of the robot 200 to electronically cause the robot 200 take a specific pose by using a controller of the robot 200, such as controller 110.

Referring back to FIGS. 4A and 4B, it is assumed that the joint 213 is in a state of FIG. 4A and the user is to teach the robot 200 to be in a state of FIG. 4B.

In this case, the user may hold the part assemblies 225 and 224 in the hand and force the part assemblies 225 and 224 downward to change a rotation angle of the joint 213 to an angle of FIG. 4B.

In this case, the joint 213 of the robot 200 and the remaining joints 211, 212, and 214 may have appropriate resistive forces to allow rotation by the user. In other words, when the user teaches the robot 200 through physical manipulation, the user may apply enough rotational torque to change a rotation angle of a joint in a pose.

A position detecting unit of each of the joints 211, 212, 213, and 214 may generate position data corresponding to a pose of the robot 200 determined by using the above method, and the controller 110 may receive, from the robot 200, pose data including the generated position data.

Also, referring back to FIGS. 5A and 5B, it is assumed that the joint 213 is in a state of FIG. 5A and the user teaches the joint 213 to be in a state of FIG. 5B.

In this case, the user may change a rotation angle of the joint 213 to an angle of FIG. 5B by manipulating the robot 200 through the input unit 130. In this case, the user manipulate the robot 200 by inputting a rotation angle of each of the joints 211, 212, 213, and 214 or by inputting a position of each of the parts 221, 222, 223, 224, and 225 through the input unit 130. Alternatively, the user may manipulate the robot 200 by dragging or clicking on a shape of the robot 200 displayed on the display unit 120 through the input unit 130.

A position detecting unit of each of the joints 211, 212, 213, and 214 may generate position data corresponding to a pose of the robot 200 determined by using the above method, and the controller 110 may receive, from the robot 200, pose data including the generated position data.

In operation S92, the controller 110 according to an exemplary embodiment may calculate a boundary plane that has a preset relationship with a reference part of the robot 200 based on the pose data received from the robot 200.

In the present disclosure, the term "reference part" may refer to any part set by the user from among one or more parts included in the robot 200 and acting as a basis for setting the boundary plane. For example, the reference part may refer to, but not limited to, a part to which a tool according to an objective and/or use of the robot 200 is attached.

For example, the user may set the part 225 (see FIG. 1) as the reference part, and may calculate the boundary plane based on the part 225 (referred to as the reference part 225).

Referring back to FIG. 6A, the controller 110 may calculate the boundary plane 600A that is a plane parallel to the reference plane 225A included in the reference part 225. In this case, the reference plane 225A may be at least one from among planes that constitute an outer appearance of the reference part 225.

The controller 110 may calculate the boundary plane 600A so that the boundary plane 600A is spaced apart by a predetermined interval from the reference plane 225A. In this case, the predetermined interval may be determined based on a length of the tool attached to the reference part 225.

Also, referring to FIG. 6B, the controller 110 may calculate the boundary plane 600B that is a plane perpendicular to the reference line 225B that is parallel to at least a part of the reference part 225. In this case, the reference line 225B may be parallel to any one from among lines that constitute the outer appearance of the reference part 225.

Even in this case, the controller 110 may calculate the boundary plane 600A so that the boundary plane 600B is spaced apart by a predetermined interval from the reference part 225. In this case, the predetermined interval may be determined based on the length of the tool attached to the reference part 225.

The controller 110 according to another exemplary embodiment may calculate a boundary plane when a reference part is at a farthest position from the location of the robot 200 while the robot 200 performs an operation based on task data. In this case, the task data may refer to a control signal for controlling the robot 200 so that the robot 200 performs a task according to an objective and/or use. For example, when the robot 200 is a delivery robot, the task data may refer to a series of control signals for causing the robot 200 to pick up an object at a specific position and putting down the object at another position.

The controller 110 according to another exemplary embodiment may calculate a boundary plane when the robot 200 operates based on the task data. In more detail, the boundary plane may be calculated when the reference part is located at the farthest position from the location of the robot 200 while the robot 200 operates based on the task data.

Accordingly, the user may allow the robot 200 to perform one period of task and a boundary plane may automatically be calculated as a result. Accordingly, the boundary plane may conveniently be set without the user needing to individually set each boundary plane.

In operation S93, the controller 110 according to an exemplary embodiment may display the boundary plane calculated by using the above process on the display unit 120.

In this case, the controller 110 may further display a 3D shape of the robot 200 on the display unit 120 based on the pose data received from the robot 200. In other words, the controller 110 may display a 3D shape of the robot 200 along with the calculated boundary plane on the display unit 120. Accordingly, the user may intuitively recognize the boundary plane.

According to the one or more exemplary embodiments, a robot system, an apparatus and method of intuitively setting a boundary plane may be provided.

In particular, a robot system, an apparatus and method of setting a boundary plane through teaching of a user may be provided.

Also, a robot system, an apparatus and method of rapidly setting a plurality of boundary planes may be provided.

Furthermore, a robot system, an apparatus for and method of setting a boundary plane to guarantee the safety of a worker may be provided.

The present disclosure may also be embodied as computer-readable codes on a computer-readable recording medium. The computer-readable recording medium is any data storage device that may store data which may thereafter be read by a computer system. Examples of the computer-readable recording medium include read-only memory (ROM), random-access memory (RAM), CD-ROMs, magnetic tapes, floppy disks, optical data storage devices, etc. The computer-readable recording medium may also be distributed over network coupled computer systems so that the computer-readable code is stored and executed in a distributive manner. Also, functional programs, codes, and code segments for accomplishing the present disclosure may be easily construed by programmers skilled in the art to which the present disclosure pertains.

While one or more exemplary embodiments have been described with reference to the figures, it will be understood by those of ordinary skill in the art that various changes in form and details may be made therein without departing from the spirit and scope of the disclosure as defined by the following claims.

What is claimed is:

1. A method of setting a boundary plane beyond which a robot should not operate, the method comprising:
    obtaining pose data of the robot;
    calculating, via a controller, a virtual plane according to a preset relationship between the virtual plane and a reference part of the robot based on the obtained pose data;
    generating the boundary plane corresponding to the calculated virtual plane; and
    displaying the generated boundary plane by controlling a display unit via the controller,
    wherein the obtaining of the pose data comprises receiving the pose data from a position detecting unit,
    wherein the pose data comprises position data, and
    wherein receiving of the pose data comprises receiving the position data after physical manipulation of the robot by a user as teaching of the user.

2. The method of claim 1, wherein the obtaining of the pose data further comprises receiving the pose data from the position detecting unit included in each of one or more joints of the robot.

3. The method of claim 2, further comprising:
    operating at least one of the one or more joints according to the teaching of the user; and
    generating the position data of each of the one or more joints corresponding to the teaching.

4. The method of claim 3, wherein the receiving of the pose data comprises receiving the position data after electrical manipulation of the robot by the user as the teaching of the user.

5. The method of claim 2, further comprising:
operating each of the one or more joints based on task data of the robot; and
generating the position data of each of the one or more joints corresponding to the task data; wherein
the calculating of the virtual plane comprises calculating the virtual plane based on the position data when the robot operates based on the task data.

6. The method of claim 5, wherein the calculating of the virtual plane comprises calculating the virtual plane when the reference part is located at a farthest position from the robot while the robot operates based on the task data.

7. The method of claim 2, further comprising measuring an angle of each of the one or more joints, wherein the pose data comprises the measured angles of each of the one or more joints.

8. The method of claim 1, wherein the calculating the virtual plane according to the preset relationship with the reference part comprises calculating the virtual plane parallel to a reference plane of the reference part.

9. The method of claim 1, wherein the calculating the virtual plane according to the preset relationship with the reference part comprises calculating the virtual plane perpendicular to a reference line that is parallel to at least one portion of the reference part.

10. The method of claim 1, wherein the displaying of the generated boundary plane comprises further displaying a three-dimensional (3D) shape of the robot based on the pose data.

11. The method of claim 1, further comprising:
obtaining the pose data of the robot for a plurality of poses of the robot;
calculating a plurality of virtual planes each corresponding to a respective one of the plurality of poses based on the pose data; generating a plurality of boundary planes corresponding to the plurality of calculated virtual planes and beyond which the robot should not operate; and
displaying the plurality of generated boundary planes.

12. An apparatus for setting a boundary plane beyond which a robot should not operate, the apparatus comprising:
a controller configured to calculate a virtual plane according to a preset relationship between the virtual plane and a reference part of the robot based on pose data of the robot, and generate the boundary plane correspond to the calculated virtual plane; and
a display unit configured to display the generated boundary plane,
wherein the controller is further configured to receive the pose data of the robot from a position detecting unit,
wherein the pose data comprises position data,
wherein the controller is further configured to receive the position data after physical manipulation of the robot by a user as teaching of the user, and
wherein the controller is further configured to control the display unit to display the generated boundary plane.

13. The apparatus of claim 12, wherein the controller is further configured to receive the pose data of the robot from the position detecting unit included in each of one or more joints of the robot.

14. The apparatus of claim 13, wherein the pose data comprises an angle measure of each of the one or more joints.

15. The apparatus of claim 12, wherein the controller is further configured to calculate the virtual plane parallel to a reference plane of the reference part.

16. The apparatus of claim 12, wherein the controller is further configured to calculate the virtual plane perpendicular to a reference line that is parallel to at least one portion of the reference part.

17. A robot system comprising:
a robot comprising one or more joints, wherein each of the one or more joints comprises a position detecting unit configured to generate position data of a respective joint of the one or more joints;
an apparatus for setting a boundary plane beyond which the robot should not operate, the apparatus configured to:
receive the position data from each position detecting unit included in the one or more joints of the robot;
calculate a virtual plane according to a preset relationship between the virtual plane and a reference part of the robot based on the generated position data; and
generate the boundary plane corresponding to the calculated virtual plane; and
display the generated boundary plane,
wherein the apparatus is further configured to receive the position data after physical manipulation of the robot by a user as teaching of the user.

18. The robot system of claim 17, wherein each of the one or more joints is configured to operate according to the teaching of a user by the physical manipulation or electrical manipulation, and
the position data of each of the one or more joints corresponds to the teaching of the user.

19. The robot system of claim 17, wherein each position detecting unit comprises an angle measuring unit configured to measure an angle of the respective joint of the one or more joints.

* * * * *